United States Patent [19]
Beck

[11] Patent Number: 5,826,863
[45] Date of Patent: Oct. 27, 1998

[54] SELF-PUMPING HYDROPNEUMATIC SHOCK ABSORBING STRUT WITH INTERNAL LEVEL REGULATION

[75] Inventor: Hubert Beck, Eitorf-Keuenhof, Germany

[73] Assignee: Fichtel & Sachs AG, Eitorf, Germany

[21] Appl. No.: 769,663

[22] Filed: Dec. 19, 1996

[30] Foreign Application Priority Data

Dec. 20, 1995 [DE] Germany .................. 195 47 536.4

[51] Int. Cl.$^6$ .................................................. B60G 17/044
[52] U.S. Cl. .................... 267/64.17; 188/289; 267/64.19
[58] Field of Search .............. 267/64.17, 64.19; 188/289, 315; 280/708

[56] References Cited

U.S. PATENT DOCUMENTS

| | | | |
|---|---|---|---|
| 3,152,667 | 10/1964 | Powell | 188/289 |
| 3,376,032 | 4/1968 | Schmid | 267/64.17 |
| 3,554,525 | 1/1971 | De Koning | 267/64.17 |
| 3,593,978 | 7/1971 | Lohr | 267/64.17 |
| 3,836,132 | 9/1974 | McNally et al. | 267/64.17 |
| 4,105,194 | 8/1978 | Sweltzer et al. | 267/64.17 |
| 4,437,548 | 3/1984 | Ashiba | 188/289 |
| 4,577,840 | 3/1986 | Meller et al. | 267/64.17 |
| 4,877,223 | 10/1989 | Hackett | 267/64.17 |
| 4,993,693 | 2/1991 | Lohr et al. | 267/64.17 |
| 5,564,680 | 10/1996 | Sano et al. | 267/64.17 |

FOREIGN PATENT DOCUMENTS

| | | |
|---|---|---|
| 2356802 | 6/1974 | Germany . |
| 3316069 | 11/1984 | Germany . |
| 4412842 | 10/1995 | Germany . |
| 4416641 | 11/1995 | Germany . |

*Primary Examiner*—Robert J. Oberleitner
*Assistant Examiner*—Chris Schwartz
*Attorney, Agent, or Firm*—Nils H. Ljungman and Associates

[57] ABSTRACT

A self-pumping hydropneumatic shock absorbing strut with internal level regulation contains a work cylinder which is filled with damping medium and is under the pressure of gas cushions, and a piston which can be displaced in the work cylinder on the end of a piston rod having a cavity disposed therein. The cavity in the piston rod acts as a pump cylinder of a pump rod which is fastened to the work cylinder, and, as a result of the spring movements, damping medium can be transported from a low pressure chamber into a high pressure chamber. The pump rod is realized in two parts, including an inner part which is connected to the work cylinder and an outer part which coaxially surrounds the inner part at least partly with radial clearance, which outer part is non-detachably connected to the inner part on the end of the outer part farther from the work cylinder.

20 Claims, 6 Drawing Sheets

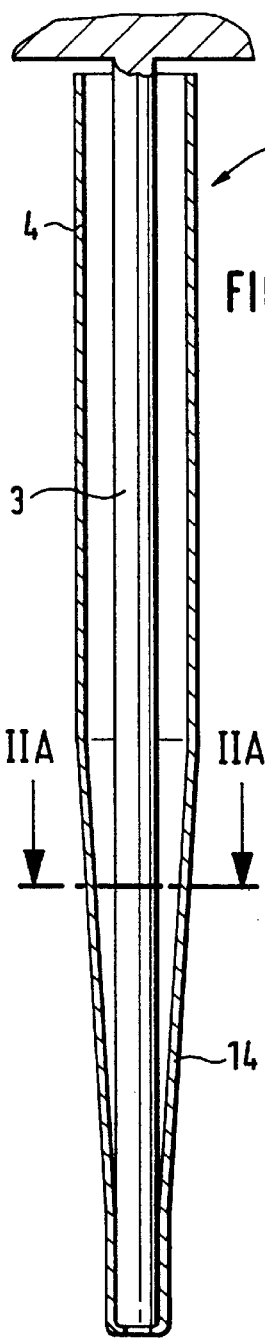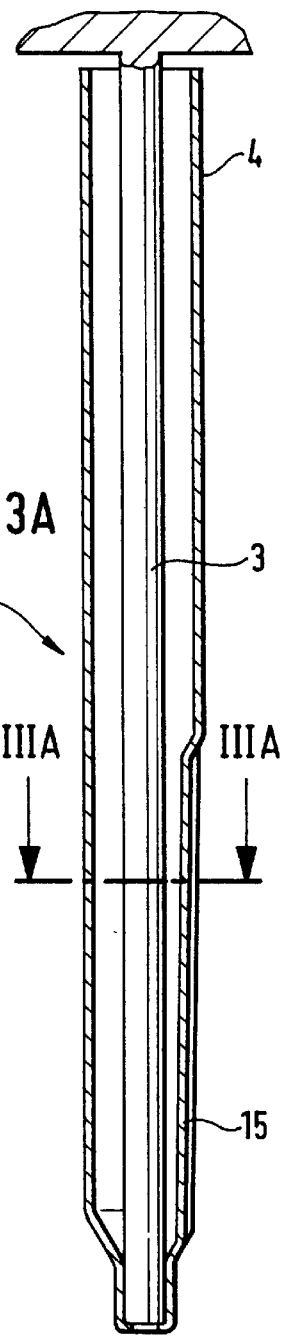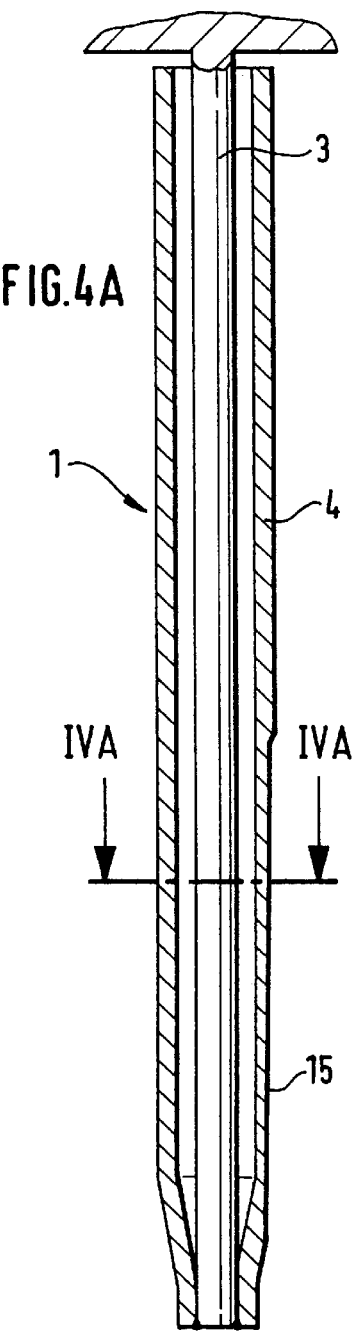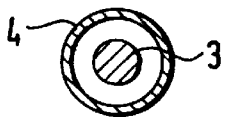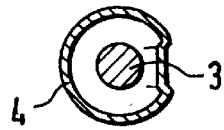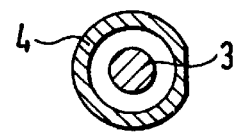

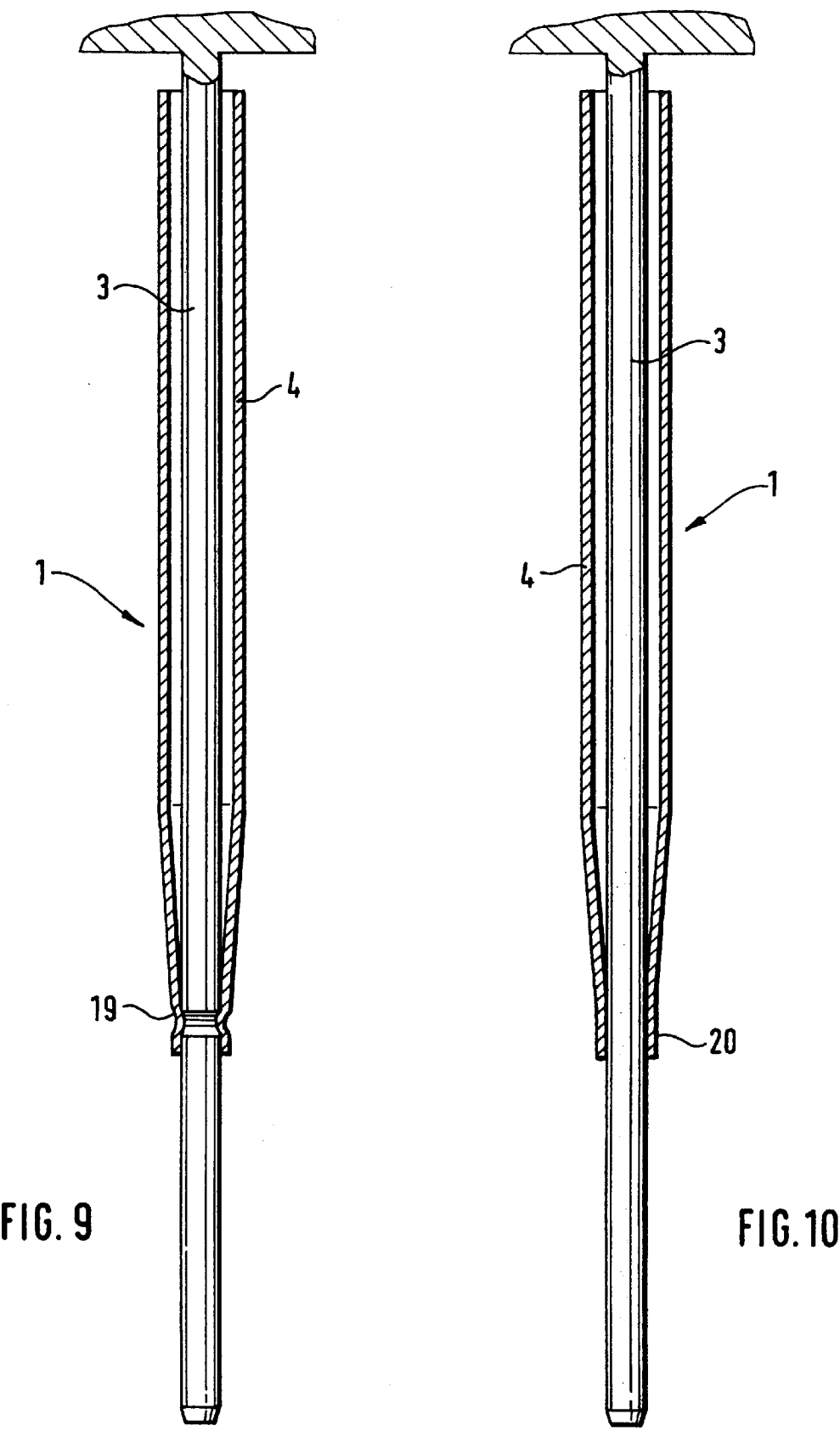

SELF-PUMPING HYDROPNEUMATIC SHOCK ABSORBING STRUT WITH INTERNAL LEVEL REGULATION

BACKGROUND OF THE INVENTION

1. Field of the Invention

This invention relates to a self-pumping hydropneumatic shock absorbing strut with internal level regulation with a work cylinder which is filled with damping medium and is under the pressure of gas cushions, and a piston which can be displaced in the work cylinder on the end of a piston rod, whereby the cavity in the piston rod acts as a pump cylinder of a pump rod which is fastened to the work cylinder, and whereby as a result of the spring movements, damping medium can be transported from a low pressure chamber into a high pressure chamber.

2. Background Information

German Patent No. 33 16 069 discloses a self-pumping hydropneumatic shock absorbing strut in which a damping piston is installed so that it can be displaced in the work cylinder and is under the pressure of gas cushions. The cavity in the piston rod is thereby realized as the pump cylinder and is pressurized by a pump rod which is fastened to the work cylinder. When the piston rod is extended, damping medium is sucked out of a reservoir via a valve, and when the piston rod is inserted, damping medium is transported into the work chamber via an additional valve. To prevent the tendency for the piston to jam in the work cylinder, or for the pump rod to jam in the pump cylinder, the pump rod must be suspended elastically, so that it can execute angular and radial compensation movements to a certain extent. These axial and angular compensation movements must be kept within certain tolerances, however, because the pump rod is guided through the base of the work cylinder.

OBJECT OF THE INVENTION

The object of the invention is to create a self-pumping hydropneumatic shock absorbing strut in which the pump rod, employing simple structural means, makes possible a radial compensation adjustment and/or an angular compensation adjustment, to prevent a jamming either of the piston or of the pump rod.

SUMMARY OF THE INVENTION

The invention teaches that this object can be accomplished if the pump rod is realized in two parts, including an inner part which can be connected to the work cylinder and an outer part which coaxially surrounds the inner part at least partly with radial clearance, which outer part can be non-detachably connected to the inner part on the end of the pump rod which is farther from the work cylinder.

When a two-part pump rod is used, it can be advantageous if the inner part, on account of the length over which it is braced, can execute angular movements on its free end. With regard to the use of relatively small diameters of the inner part, the righting moments can therefore be correspondingly small. This feature also can have a positive effect on the wear of the telescoping parts. Since the outer part is fastened on the end of the inner part, a relatively rigid pump rod can be achieved, which can adapt practically without righting forces to the piston or the hollow piston rod sliding over it.

In an additional embodiment, the inner part can be made of solid material.

In one embodiment which can be advantageous from a manufacturing point of view, the outer part can be realized in the form of a tubular part.

The manufacturing process can also be simplified if the inner part is realized in the form of a cylinder over at least a portion of its length.

In an additional embodiment, the invention teaches that the outer part can have at least a partly conical portion in the terminal area which is farther from the work cylinder. An advantage of this realization is that when the specified level is reached, the efficiency of the pump can decrease in the vicinity of the conical part, and thus the specified level can be reached correspondingly slowly.

The invention teaches that a connection which is simple to manufacture can be created between the inner and outer part by connecting the inner part to the outer part positively and non-positively.

A particularly favorable compensation movement in the radial and angular directions can be achieved if the inner part is realized so that it is at least partly elastic.

A structurally simple suspension of the pump rod can be achieved by holding the inner part in a retaining element which is connected to the work cylinder and straddles the end area of the work cylinder.

The above discussed embodiments of the present invention will be described further hereinbelow with reference to the accompanying figures.

BRIEF DESCRIPTION OF THE DRAWINGS

Preferred embodiments of the invention are schematically illustrated in the accompanying drawings, in which:

FIGS. 2A to 4B are details which illustrate a variant of a two-piece pump rod;

FIGS. 9 and 10 illustrate additional embodiments of pump rods.

DESCRIPTION OF THE PREFERRED EMBODIMENT

Figure 1:
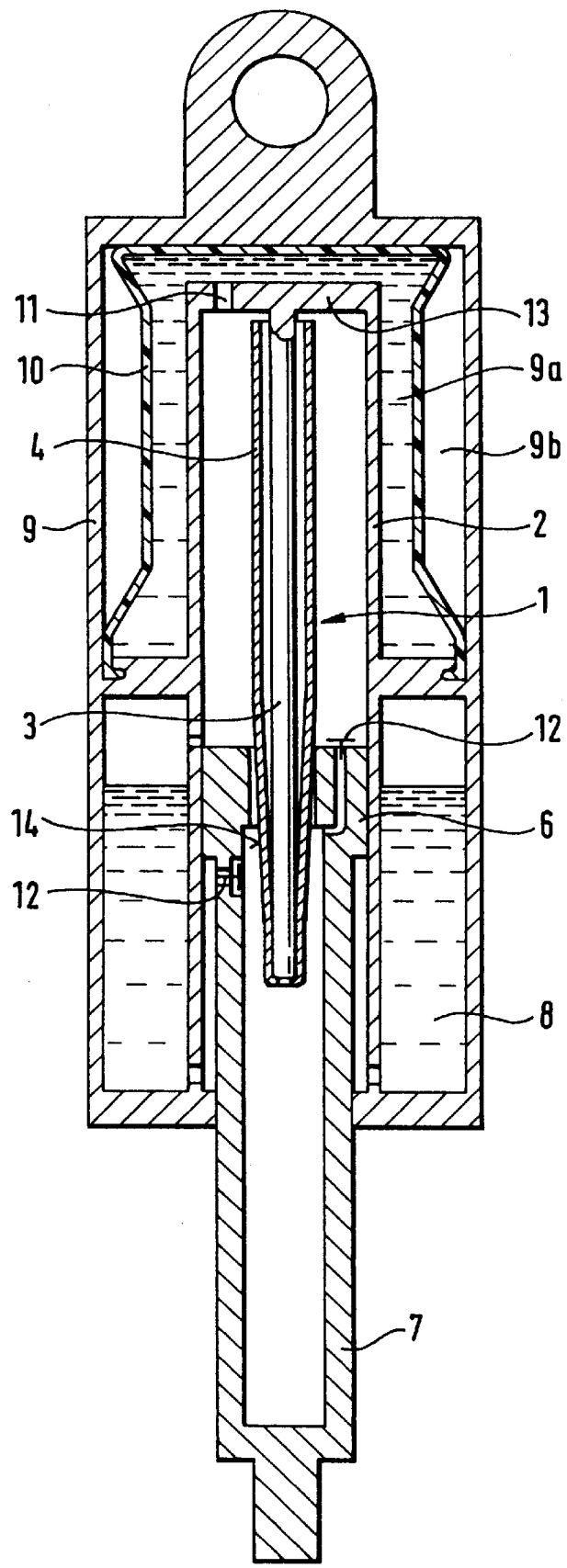
FIG. 1 shows a self-pumping hydropneumatic shock absorbing strut in a sectional view.

The self-pumping hydropneumatic shock absorbing strut illustrated in FIG. 1 with internal level regulation for motor vehicles includes a work cylinder 2 of the shock absorbing strut, in which work cylinder 2 a damping piston 6 on the end of a hollow piston rod 7 slides. The work cylinder 2 is closed on the one side by a base and on the other side by a cover, through which the hollow piston rod 7 extends outward in a sealed manner. The shock absorbing strut is fastened to the body of a vehicle and to the axle of a vehicle in a manner not illustrated but which is well known. The work cylinder 2 is surrounded by a ring-shaped low pressure chamber 8 which is filled partly with damping medium and partly with gas, and in the opposite area, the work cylinder 2 is surrounded by a high pressure chamber 9 which is divided by means of a membrane 10 into an area 9a which is filled with damping medium and an area 9b which is filled with gas.

In the completely depressurized state, i.e. when the shock absorbing strut is not pumped up, the same pressure prevails in the low pressure chamber 8 and in the high pressure chamber 9. The work cylinder 2, by means of borings or passages 11 on an end surface 13, has a throttled and/or damped connection with the high pressure chamber 9. The damping piston 6 is provided with non-return valves 12 to control the shock absorbing strut, whereby the work cylinder 2 is provided in its end surface 13 with a pump rod 1 which includes an inner part 3 and an outer part 4. The pump rod 1 is guided through an opening of the damping piston 6, and together with a cavity formed in the hollow piston rod 7 forms a pump. The inner part 3 of the pump rod 1 is elastic, on account of its dimensions, with respect to the end surface 13 of the work cylinder 2, whereby the outer part 4 of the pump rod 1 is relatively rigid and is fastened with the inner part 3 to the end of the inner part 3 further from the end surface 13. As a result of the relative movement of the inner part 3 with respect to the outer part 4, radial and angular movements can be executed, so that the pump rod 1 is correctly guided in the recess of the damping piston 6 and does not have a tendency to jam.

The shock-absorbing strut functions as follows. When the pump rod 1 is inserted into the hollow piston rod 7, the damping medium in the cavity of the piston rod 7 is transported on account of the non-return valve 12 into the upper part of the work cylinder 2, and from there via the boring 11 pressurizes the gas cushion 9b in the high pressure chamber 9. When the piston rod 7 is extended, damping medium once again flows, controlled by the non-return valve 12, out of the low pressure chamber 8 via corresponding openings into the cavity of the hollow piston rod 7. After reaching the desired level, any further pumping action is neutralized by a conical area 14 of the pump rod 1.

Figure 1A:
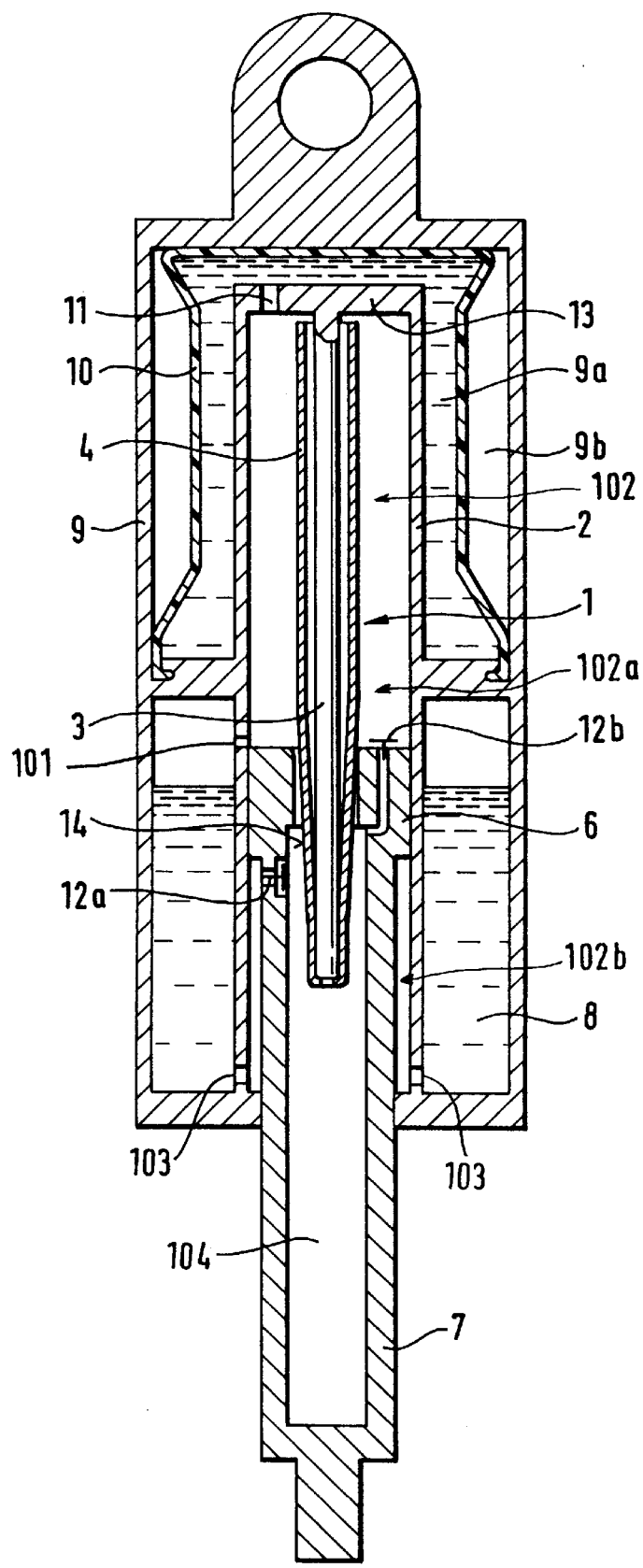
FIG. 1a shows the self-pumping hydropneumatic shock absorbing strut of FIG. 1 including more detail.

FIG. 1a shows an embodiment including additional detail from that shown in FIG. 1. The damping piston 6 can divide a work chamber 102 into an upper work chamber 102a and a lower work chamber 102b. The upper work chamber 102a can be directly connected to the high pressure chamber 9 by way of the boring 11. The pump chamber 104 for the pump rod 1 can be contained in the hollow area of the hollow piston rod 7. In addition, there can be flow passages 103 to allow the flow of damping medium between the low pressure chamber 8 and the lower work chamber 102b. The lower work chamber 102b can then be connected to the pump chamber 104 by way of the non-return valve 12a. The pump chamber 104 can then be connected to the upper work chamber 102a by way of a second non-return valve 12b. There can also be a return flow passage 101 to allow flow of damping medium from the upper work chamber 102a back to the low pressure chamber 8.

In accordance with one embodiment, the return flow passage 101 can be used to achieve the level regulation for the shock absorbing strut. When the strut is in the compression stage, the return flow passage 101 can be blocked by the damping piston 6 or can permit flow into the lower work chamber 102b, depending on the location of the piston 6. When the strut is in the decompression stage, as shown in FIG. 1a, the piston 6 leaves the return passage 101 unblocked and in this stage allows return flow to the low pressure chamber 8.

FIGS. 2 to 4 show additional embodiments of the pump rod 1, in each of which the inner part 3 is connected to the outer part 4. To achieve regulation or to achieve the short circuit, so that the level no longer continues to increase, FIG. 2 shows a conical area 14, FIG. 3 shows a flattened area 15, and FIG. 4 shows an additional embodiment of a flattened area 15.

Figure 5:
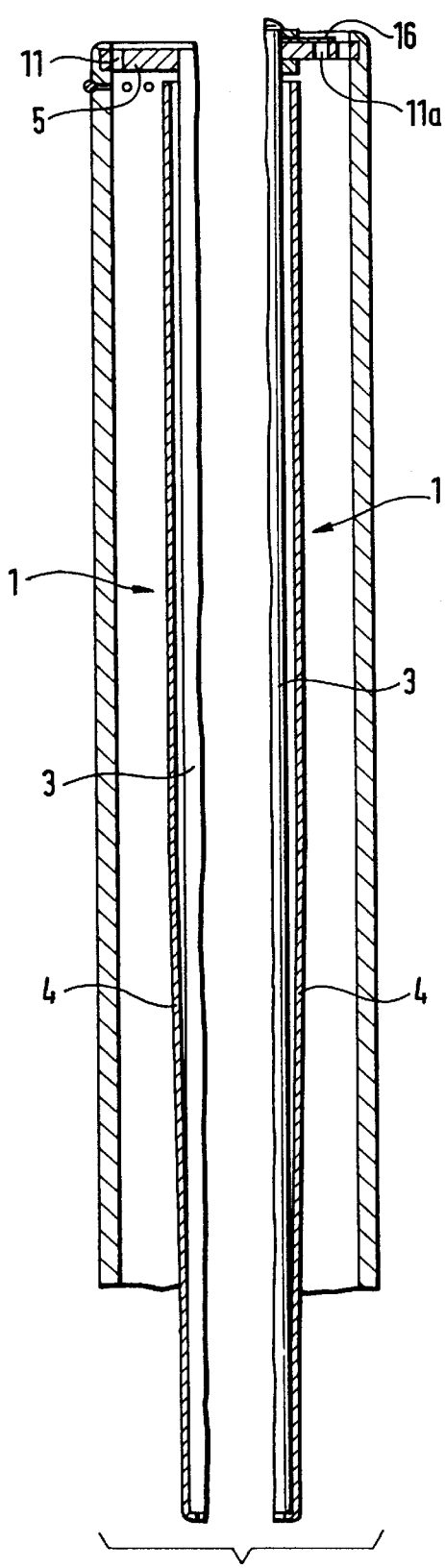
FIGS. 5 to 7 are sectional views which illustrate additional variants of pump rods.
Figure 6:
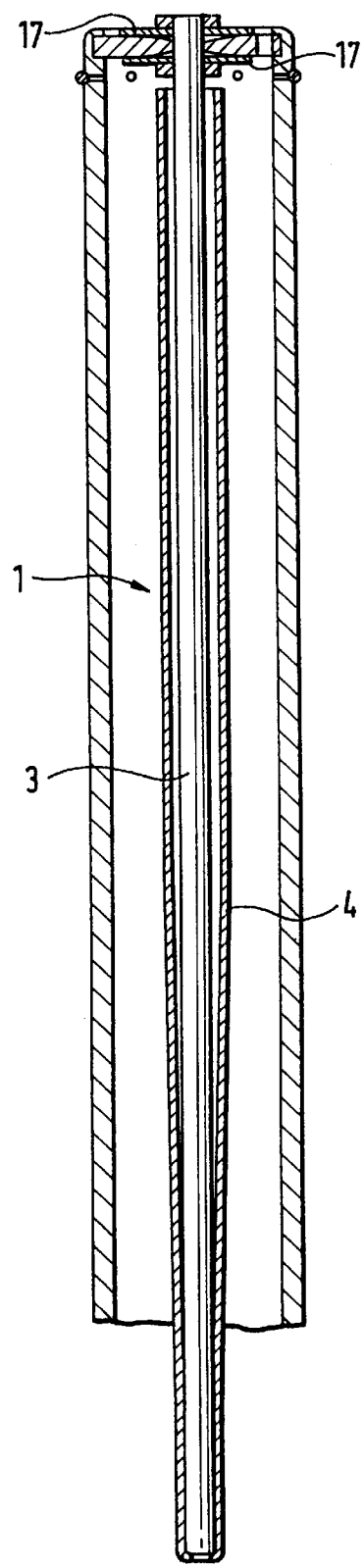
Figure 7:
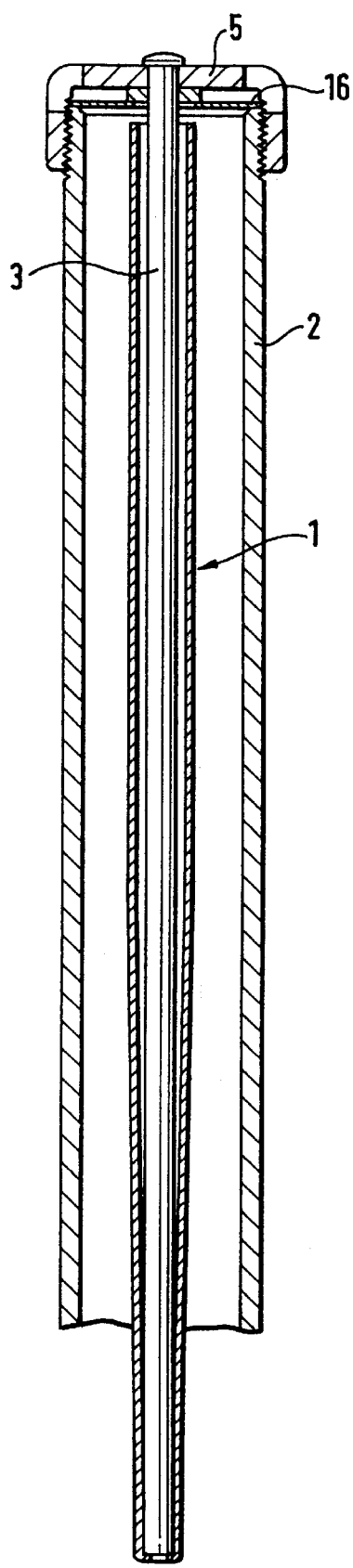

FIGS. 5 to 7 illustrate additional embodiments of a pump rod 1, whereby in FIG. 5 the inner part 3 is connected to the outer part 4 by a corresponding weld in the lower area. The external surface of the outer part 4 can thereby be hardened by a corresponding heat treatment. The pump rod 1 is suspended by means of a retaining element 5, whereby the borings 11 can be realized in the form of a throttle, or the borings 11a can be realized with a spring plate 16 to damp the damping medium. FIG. 6 illustrates an additional embodiment in which the pump rod 1 is suspended by means of spring elements 17, and is thereby simultaneously able to absorb axial movement to prevent surges in the shock absorbing strut.

FIG. 7 illustrates a retaining element 5 in which the spring plate 16 to damp the flow of the damping medium is held between the inner part 3 and the end area of the work cylinder 2. In the one compression direction, the damping medium will flow between the end area of the work cylinder 2 and the outer edge of the spring plate 16, while in the opposite decompression direction, the spring plate 16 can be lifted up off its valve seat radially inwardly toward the retaining element 5, and can therefore also allow the damping medium to pass.

Figure 8:
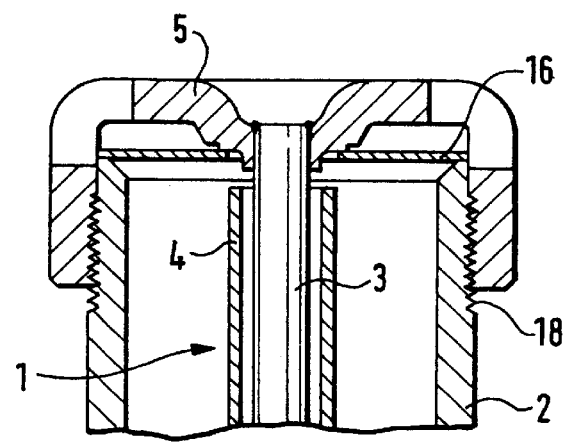
FIG. 8 illustrates a suspension of the pump rod on the work cylinder together with a damping valve.

FIG. 8 shows an embodiment in which the inner part 3 of the pump rod 1 is welded directly to the retaining element 5, so that an assembly is formed which includes the inner part 3 and the outer part 4 of the pump rod 1 and the retaining element 5. This assembly is held on the work cylinder by means of a threaded portion 18, whereby the spring plate 16 is located between the retaining element 5 and the end area of the work cylinder 2, and a corresponding bias can be applied by means of the threaded portion 18. Here again, the damping medium runs in the direction to achieve compression between the work cylinder 2 and the outer area of the spring plate 16, while in the decompression direction, the spring plate 16 is lifted radially inwardly with respect to the valve seat on the retaining element 5, and in this direction guarantees a continuous flow.

FIGS. 9 and 10 illustrate an additional embodiment of a pump rod 1, in which the inner part 3 is connected to the outer part either by means of a positive connection 19 or a welded connection 20, whereby both parts are not located immediately in the direct terminal area of the inner part 3.

In accordance with one embodiment of the present invention, the positive connection 19 can be considered to be a deformation or crimping of one end of the outer part 4 onto a recessed area of the inner part 3.

One feature of the invention resides broadly in the self-pumping hydropneumatic shock absorbing strut with internal level regulation, with a work cylinder which is filled with damping medium and is under the pressure of gas cushions, and a piston which can be displaced in the work cylinder on the end of a piston rod, whereby the cavity in the piston rod acts as a pump cylinder of a pump rod which is fastened to the work cylinder, and whereby as a result of the spring movements, damping medium can be transported from a low pressure chamber into a high pressure chamber, characterized by the fact that the pump rod 1 is realized in two parts, consisting of an inner part 3 which is connected to the work cylinder 2 and an outer part 4 which coaxially surrounds the inner part 3 at least partly with radial clearance, which outer part 4 is non-detachably connected to the inner part 4 on the end of the outer part 4 farther from the work cylinder 2.

Another feature of the invention resides broadly in the shock absorbing strut characterized by the fact that the inner part 3 is manufactured from solid material.

Yet another feature of the invention resides broadly in the shock absorbing strut characterized by the fact that the outer part 4 is realized in the form of a tubular part.

Still another feature of the invention resides broadly in the shock absorbing strut characterized by the fact that the inner part 3 is realized in the form of a cylinder over at least a portion of its length.

A further feature of the invention resides broadly in the shock absorbing strut characterized by the fact that the outer part 4 has an at least partly conical shape in the terminal area farther from the work cylinder 2.

Another feature of the invention resides broadly in the shock absorbing strut characterized by the fact that the inner part 3 is positively and/or non-positively connected to the outer part 4.

Yet another feature of the invention resides broadly in the shock absorbing strut characterized by the fact that the inner part 3 is realized so that it is at least partly elastic.

Still another feature of the invention resides broadly in the shock absorbing strut characterized by the fact that the inner part 3 is held in a retaining element 5 which is connected to the work cylinder 2 and straddles the end area of the work cylinder 2.

Examples of hydropneumatic struts with internal level regulation, components of which may be used in conjunction with embodiments of the present invention, can be found in the following U.S. Pat. No. 5,062,616; No. 4,993,693; No. 4,577,840; and No. 4,502,672.

Examples of shock absorbing struts which may be used in conjunction with embodiments of the present invention, can be found in the following U.S. Pat. No. 5,551,541; No. 5,547,050; No. 5,522,483; No. 5,480,129; No. 5,477,949; No. 5,467,851; No. 4,850,460; No. 4,802,561; No. 4,785,920; and No. 4,650,042.

All, or substantially all, of the components and methods of the various embodiments may be used with at least one embodiment or all of the embodiments, if more than one embodiment is described herein.

All of the patents, patent applications and publications recited herein are hereby incorporated by reference as if set forth in their entirety herein, The corresponding foreign patent publication applications, namely, Federal Republic of Germany Patent Application No. 195 47 536.4, filed on Dec. 20, 1995, having inventor Hubert Beck, and DE-OS 195 47 536.4 and DE-PS 195 47 536.4are hereby incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A self-pumping hydropneumatic shock absorbing strut with internal level regulation comprising:

a first end and a second end;

a cylinder defining a chamber therein, said cylinder containing a damping fluid;

said cylinder being disposed between said first end and said second end;

said first end comprising first means for connecting said shock absorbing strut to a first part of a motor vehicle;

said second end comprising second means for connecting said shock absorbing strut to a second part of a motor vehicle;

a piston rod sealingly projecting into said cylinder and being axially displaceable within said cylinder;

said piston rod comprising a hollow portion disposed therein;

a piston disposed on said piston rod;

said piston being slidingly disposed within said cylinder to sealingly divide said chamber into first and second chambers;

pump means for pumping said damping medium from said second chamber into said first chamber;

said pump means comprising:
a pump rod; and
a pump chamber;

said pump rod comprising first and second pump rod portions;

said second pump rod portion being coaxially disposed about said first pump rod portion;

said second pump rod portion having a section;

said section of said second pump rod portion having an internal diameter;

said first pump rod portion having an external diameter;

said internal diameter of said section being greater than said external diameter of said first pump rod portion to provide a radial clearance between said first and second pump rod portions along a substantial portion of said pump rod;

said first pump rod portion having a first end and a second end;

said first end of said first pump rod portion being fastened to said cylinder;

said second pump rod portion having a first end and a second end; and said second end of said second pump rod portion being non-detachably fastened to said first pump rod portion a substantial distance from said first end of said first pump rod portion.

2. The shock absorbing strut as claimed in claim 1 wherein:

said second pump rod portion is at least one of: radially and angularly movable with respect to said first pump rod portion;

said second end of said second pump rod portion is non-detachably fastened to said second end of said first pump rod portion; and said first end of said second pump rod portion is not attached to said cylinder to permit said second pump rod portion to be said at least one of radially and angularly movable with respect to said first pump rod portion.

3. The shock absorbing strut as claimed in claim 2 wherein:

said hollow portion of said piston rod defines said pump chamber;

said piston comprises a hole disposed therethrough, said hole being disposed between said first chamber and said pump chamber;

said pump rod is disposed through said hole in said piston and extends into said pump chamber;

said section of said second pump rod portion has an external diameter;

said hole in said piston has a diameter; and said diameter of said hole in said piston is substantially equal to said external diameter of said section.

4. The shock absorbing strut as claimed in claim 3 wherein:

said section of said second pump rod portion is a first section;

said second pump rod portion comprises a second section, said second section being disposed at said second end of said second pump rod portion;

said second section of said second pump rod portion has first and second ends;

said first end of said second section is adjacent said first section;

said second section has a first diameter at said first end, said first diameter is substantially equal to said external diameter of said first section;

said second section has a second diameter at said second end, said second diameter is substantially equal to said external diameter of said first pump rod portion; and said second section comprises one of:

a conical section with said first diameter disposed at said first end and said second diameter disposed at said second end;

a substantially cylindrical section with a planar side, said planar side being a cut-away surface of said section, said substantially cylindrical section having a longitudinal axis, said second diameter extending from the middle of said planar side, through said longitudinal axis of said section, to a point on the substantially cylindrical section opposite the middle of said planar section; and a substantially cylindrical section with a planar side, said planar side is recessed from a cut-away surface of said cylindrical section, said substantially cylindrical section having a longitudinal axis, said second diameter is defined from the middle of said planar side, through said longitudinal axis of said substantially cylindrical section, to a point on the substantially cylindrical section opposite the middle of said planar section.

5. The shock absorbing strut as claimed in claim 4 wherein:

said first pump rod portion comprises a section, said section of said first pump rod portion comprising a substantial portion of said first pump rod portion; and said section of said first pump rod portion is cylindrical.

6. The shock absorbing strut as claimed in claim 5 wherein:

said first pump rod portion comprises a solid pump rod portion;

said second pump rod portion comprises a substantially tubular pump rod portion coaxially disposed about said first pump rod portion;

said cylinder comprises an end surface, said end surface being disposed at one of said first and second ends of said cylinder and defines at least a part of said first chamber; and said shock absorbing strut comprises means for elastically connecting said first end of said first pump rod portion to said end surface.

7. The shock absorbing strut as claimed in claim 6 wherein said first pump rod portion is non-detachably fastened to said second end of said second pump rod portion by one of:

a weld; and a shrink-fitted connection, wherein said shrink-fitted connection comprises:

said first pump rod portion having a first diameter, a second diameter and a third diameter defined perpendicular to the longitudinal axis of said first pump rod portion, said second diameter being disposed between said first and third diameters;

said second diameter being substantially less than both said first and third diameters to form a groove in said first pump rod portion; and a portion of said second pump rod portion being shrink-fitted into said groove and engaged within said groove.

8. The shock absorbing strut as claimed in claim 7 wherein said second end of said second pump rod portion is connected to one of:

said second end of said first pump rod portion; and section of said first pump rod portion, said section is a substantial distance from said second end of said first pump rod portion.

9. The shock absorbing strut as claimed in claim 9 comprising:

a retaining element;

said retaining element being disposed at said end surface of said work cylinder; and said retaining element being disposed to fixedly hold said first pump rod portion.

10. The shock absorbing strut as claimed in claim 9 comprising:

a high pressure chamber;

a spring plate;

said spring plate being disposed adjacent said retaining element;

said spring plate being disposed to regulate flow of said damping medium between said first chamber and said high pressure chamber;

said retaining element comprising a spring element for absorbing axial movement of said pump rod;

a low pressure chamber for holding said damping medium;

said low pressure chamber being in fluid communication with said second chamber;

said high pressure chamber comprising:

a gas chamber;

a liquid chamber; and a flexible membrane disposed between said gas chamber and said liquid chamber to separate said gas chamber and said liquid chamber from one another;

said high pressure chamber being in fluid communication with said first chamber;

a first non-return valve, said first non-return valve being disposed to allow flow of damping medium from said pump chamber to said first chamber; and a second non-return valve, said second non-return valve being disposed to allow flow of damping medium from said second chamber to said pump chamber.

11. The shock absorbing strut as claimed in claim 8 comprising:

a low pressure chamber configured for holding said damping medium;

said low pressure chamber being in fluid communication with said second chamber;

a high pressure chamber;

said high pressure chamber comprising:
  a gas chamber;
  a liquid chamber; and
  a flexible membrane disposed between said gas chamber and said liquid chamber to separate said gas chamber and said liquid chamber from one another;

said high pressure chamber being in fluid communication with said first chamber;

a first non-return valve, said first non-return valve being disposed to allow flow of damping medium from said pump chamber to said first chamber; and a second non-return valve, said second non-return valve being disposed to allow flow of damping medium from said second chamber to said pump chamber.

12. A self-pumping hydropneumatic shock absorbing strut with internal level regulation comprising:
  a first end and a second end;
  a cylinder defining a chamber therein, said cylinder containing a damping fluid;
  said cylinder being disposed between said first end and said second end;
  said first end comprising first means for connecting said shock absorbing strut to a first part of a motor vehicle;
  said second end comprising second means for connecting said shock absorbing strut to a second part of a motor vehicle;
  a piston rod sealingly projecting into said cylinder and being axially displaceable within said cylinder;
  a piston disposed on said piston rod;
  said piston being slidingly disposed within said cylinder to sealingly divide said chamber into first and second chambers;
  means for self-levelling said shock absorbing strut;
  said self-levelling means comprising a pump rod;
  said pump rod comprising first and second pump rod portions;
  said second pump rod portion being coaxially disposed about said first pump rod portion;
  said second pump rod portion having a section;
  said section of said second pump rod portion having an internal diameter;
  said first pump rod portion having an external diameter;
  said internal diameter of said section being greater than said external diameter of said first pump rod portion to provide a radial clearance between said first and second pump rod portions along a substantial portion of said pump rod;
  said first pump rod portion having a first end and a second end disposed opposite to said first end;
  said first end of said first pump rod portion being fastened to said cylinder;
  said second pump rod portion having a first end and a second end disposed opposite to said first end; and
  said second end of said second pump rod portion being non-detachably fastened to said first pump rod portion a substantial distance from said first end of said first pump rod portion.

13. The shock absorbing strut as claimed in claim 12 wherein said second pump rod portion is at least one of: radially and angularly movable with respect to said first pump rod portion.

14. The shock absorbing strut according to claim 13 wherein said second end of said second pump rod portion is non-detachably fastened to said second end of said first pump rod portion.

15. The shock absorbing strut according to claim 14 wherein said first end of said second pump rod portion is not attached to said cylinder to permit said second pump rod portion to be said at least one of radially and angularly movable with respect to said first pump rod portion.

16. The shock absorbing strut as claimed in claim 15 wherein:
  said piston rod comprises a hollow portion disposed therein;
  said self levelling means comprises pump means for pumping said damping medium from said first chamber into said second chamber;
  said pump means comprises:
    said pump rod; and
    a pump chamber;
  said hollow portion of said piston rod defines said pump chamber;
  said piston comprises a hole disposed therethrough, said hole being disposed between said first chamber and said pump chamber;
  said pump rod is disposed through said hole in said piston and extends into said pump chamber;
  said section of said second pump rod portion has an external diameter;
  said hole in said piston has a diameter; and
  said diameter of said hole in said piston is substantially equal to said external diameter of said section.

17. The shock absorbing strut as claimed in claim 16 wherein:
  said section of said second pump rod portion is a first section;
  said second pump rod portion comprises a second section, said second section being disposed at said second end of said second pump rod portion;
  said second section of said second pump rod portion has first and second ends;
  said first end of said second section is adjacent said first section;
  said second section has a first diameter at said first end, said first diameter is substantially equal to said external diameter of said first section;
  said second section has a second diameter at said second end, said second diameter is substantially equal to said external diameter of said first pump rod portion; and
  said second section comprises one of:
    a conical section with said first diameter disposed at said first end and said second diameter disposed at said second end;
    a substantially cylindrical section with a planar side, said second diameter extending from the middle of said planar side, through the central axis of said second section, to the opposite side; and
    a substantially cylindrical section with a planar side, said planar side is recessed with respect to said cylindrical section, said second diameter is defined from the middle of said planar side, through the central axis of said second section, to the opposite side.

18. The shock absorbing strut as claimed in claim 17 wherein:

said first pump rod portion comprises a section, said section of said first pump rod portion comprising a substantial portion of said first pump rod portion;

said section of said first pump rod portion is cylindrical;

said first pump rod portion comprises a solid pump rod portion;

said second pump rod portion comprises a substantially tubular pump rod portion coaxially disposed about said first pump rod portion;

said cylinder comprises an end surface, said end surface being disposed at one of said first and second ends of said cylinder and defines at least a part of said first chamber;

said shock absorbing strut comprises means for elastically connecting said first end of said first pump rod portion to said end surface;

said first pump rod portion is connected to said second end of said second pump rod portion by one of:

a weld;

a shrink-fitted connection, wherein said shrink-fitted connection comprises:

said first pump rod portion having a first diameter, a second diameter and a third diameter defined perpendicular to the longitudinal axis of said first pump rod portion, said second diameter being disposed between said first and third diameters;

said second diameter being substantially less than both said first and third diameters to form a groove in said first pump rod portion; and a portion of said second pump rod portion being shrink-fitted into said groove and engaged within said groove; and said second end of said second pump rod portion is connected to one of:

said second end of said first pump rod portion; and a section of said first pump rod portion, said section is a substantial distance from said second end of said first pump rod portion.

19. The shock absorbing strut as claimed in claim 18 comprising:

a low pressure chamber configured for holding said damping medium;

said low pressure chamber being in fluid communication with said second chamber;

a high pressure chamber;

said high pressure chamber comprising:

a gas chamber;

a liquid chamber; and a flexible membrane disposed between said gas chamber and said liquid chamber to separate said gas chamber and said liquid chamber from one another;

said high pressure chamber being in fluid communication with said first chamber;

a first non-return valve, said first non-return valve being disposed to allow flow of damping medium from said pump chamber to said first chamber; and a second non-return valve, said second non-return valve being disposed to allow flow of damping medium from said second chamber to said pump chamber.

20. The shock absorbing strut as claimed in claim 18 comprising:

a retaining element;

said retaining element being disposed at said end surface of said work cylinder;

said retaining element being disposed to fixedly hold said first pump rod portion;

a high pressure chamber;

a spring plate;

said spring plate being disposed adjacent said retaining element;

said spring plate being disposed to regulate flow of said damping medium between said first chamber and said high pressure chamber;

said retaining element comprising a spring element for absorbing axial movement of said pump rod;

a low pressure chamber for holding said damping medium;

said low pressure chamber being in fluid communication with said second chamber;

said high pressure chamber comprising:

a gas chamber;

a liquid chamber; and a flexible membrane disposed between said gas chamber and said liquid chamber to separate said gas chamber and said liquid chamber from one another;

said high pressure chamber being in fluid communication with said first chamber;

a first non-return valve, said first non-return valve being disposed to allow flow of said damping medium from said pump chamber to said first chamber; and a second non-return valve, said second non-return valve being disposed to allow flow of said damping medium from said second chamber to said pump chamber.

\* \* \* \* \*

UNITED STATES PATENT AND TRADEMARK OFFICE
CERTIFICATE OF CORRECTION

PATENT NO. : 5,826,863
DATED : October 27, 1998
INVENTOR(S) : Hubert BECK

It is certified that error appears in the above-identified patent and that said Letters Patent is hereby corrected as shown below:

In column 8, line 23, Claim 8, before the first occurrence of 'section' insert --a--.

In column 8, line 26, Claim 9, after 'claim', delete "9" and insert --8--.

Signed and Sealed this

Seventh Day of September, 1999

Attest:

Q. TODD DICKINSON

Attesting Officer    Acting Commissioner of Patents and Trademarks